Patented Apr. 21, 1925.

1,534,678

UNITED STATES PATENT OFFICE.

STANLEY J. BEEBE, OF UNION, NEW YORK.

PIGMENT AND PROCESS OF MAKING SAME.

No Drawing.　　Application filed April 12, 1924.　Serial No. 706,177.

*To all whom it may concern:*

Be it known that I, STANLEY J. BEEBE, a citizen of the United States, residing at Union, in the county of Broome and State of New York, have invented certain new and useful Improvements in Pigments and Processes of Making Same, of which the following is a specification.

This invention relates to production of pigment for use in paints, inks, and other compositions in which so-called carbon black, lampblack, and other pigmental ingredients ordinarily are employed.

More particularly, the invention is concerned with production, from paper, waste paper, or material of like properties, of a pigment that is suitable for grinding, rubbing up, or otherwise incorporating with oils or other vehicles or ingredients in the production of paints and other coatings and of printers' and other inks.

Although the general run of paper may be employed in production of pigment in accordance with the invention, newspapers or other paper that have served the purposes for which originally produced and have become waste can be used most advantageously, for the reason that, being waste, they are cheap. Moreover, old paper, as well as new, possesses the inherent characteristics that make for a product that is capable of being employed in practically the same manner as carbon black, lampblack, and the like.

The material from which the pigment is to be derived, say waste newspaper material, for example, is placed in a retort or other suitable closed container provided with a vent arranged to permit escape of distillation products without subjecting the container to much internal pressure, and arranged also to prevent entrance of air thereto so that combustion therein is avoided. Heat is applied to the exterior of the container, as by a furnace fire or by oil or gas burners therebeneath. When gas-burners are employed, gas evolved from the material in the container may be fed thereto and thus used as a combustion material.

The material in the container is subjected to calcining treatment in this manner at temperatures ranging from 200 to 2000 degrees F. for a period sufficiently long to expel all, or practically all, vaporizable constituents and until no gas is evolved at temperatures not exceeding 2000 degrees F. This subjection of the material to destructive distillation until flow of distillation products ceases results in a residue of the nature of black char, which constitutes the substance of which the pigment is formed.

The residual pigmental substance consists mainly of pure carbon in finely-divided particles of infinitesimal size, together with some ash and other matter. The proportion of the constituents is dependent upon the character of the stock used. With some scrap paper that has been used in accordance with the invention, the residue has been found to contain from seventy to eighty per cent of carbon, comparatively small quantities of hydrogen, nitrogen, sulphur, and oxygen, and from ten to twenty per cent of ash. Irrespective of the character of the paper stock, however, the residue consists for the most part and mainly of carbon in a form that can be converted readily into pigment.

The dry residual mass pulverizes very readily. After removal from the container, it is pulverized by grinding to a very fine powder. Then it is in condition for use as a pigment.

Before or after grinding the residue, the ash, if desired, may be removed by methods well known in the art.

The pigment thus produced is worked into oils, japans, or other paint vehicle materials in a manner similar to that employed in the incorporation of carbon black, lampblack, or other pigments in the production of paint and other coatings.

The pigment readily absorbs the oils or other vehicles in which it is ground, and it produces a soft paint, with comparatively little grinding in the grinding compounds, that is of very fine texture and of excellent heat and weather resisting characteristics.

Having thus described my invention, what I claim as new, and desire to secure by Letters Patent, is—

1. A pigmental substance consisting of the pulverized residue of destructive distillation of paper.

2. Pigment that includes pulverized residue of destructive distillation of paper.

3. A method of making pigment material that includes subjection of paper in a closed container to externally-applied heat sufficient to produce therein a temperature not exceeding 2000 degrees F. and for a period sufficient to expel therefrom all constituents vaporizable at temperatures not exceeding 2000 degrees F., and pulverizing the residue.

4. A method of making pigment material that includes subjection of paper material to destructive distillation until flow of distillation products ceases, and pulverizing the residue.

5. A method of making pigment material that includes subjection of paper material to destructive distillation at temperatures not exceeding 2000 degrees F. until flow of distillation products ceases, and pulverizing the residue.

In testimony whereof I affix my signature.

STANLEY J. BEEBE.